(12) United States Patent
Kepley et al.

(10) Patent No.: US 8,236,718 B1
(45) Date of Patent: Aug. 7, 2012

(54) CONTINUOUS-FIBER-REINFORCED AMORPHOUS CERAMIC COMPOSITION

(76) Inventors: Larry J. Kepley, Placitas, NM (US); George M. Jacobsen, Albuquerque, NM (US)

( * ) Notice: Subject to any disclaimer, the term of this patent is extended or adjusted under 35 U.S.C. 154(b) by 0 days.

(21) Appl. No.: 12/456,873

(22) Filed: Jun. 23, 2009

Related U.S. Application Data

(60) Provisional application No. 61/074,961, filed on Jun. 23, 2008.

(51) Int. Cl.
*C04B 35/571* (2006.01)
*C04B 35/577* (2006.01)

(52) U.S. Cl. ....... 501/92; 501/95.2; 501/96.2; 501/96.3; 428/293.4; 428/293.7; 428/294.1

(58) Field of Classification Search ............ 501/92, 501/95.2, 96.2, 96.3; 428/293.4, 293.7, 294.1
See application file for complete search history.

(56) References Cited

U.S. PATENT DOCUMENTS 6,709,736 B2 * 3/2004 Gruber et al. ............ 428/293.4

FOREIGN PATENT DOCUMENTS

JP 05270922 * 10/1993

* cited by examiner

*Primary Examiner* — Karl Group
(74) *Attorney, Agent, or Firm* — Alberto A. Leon, Esq.; Bauman Dow & Leon PC

(57) ABSTRACT

The application discloses and claims an oxidation resistant, continuous-fiber-reinforced ceramic composition, durable at temperatures above 1000° C., and capable of taking on any arbitrary near net shape formed without machining and tooling. The composition of the invention comprises a fine grained ceramic matrix which in turn comprises a mixture of a $ZrB_2$ phase and a SiC phase with the matrix being reinforced with SiC or C or an oxide fiber, resulting in a fine grained $ZrB_2$—SiC matrix with domain sizes $\leq 0.5$ μm. The $ZrB_2$ phase of the invention is capable of forming small microcrystalline domains $\leq 0.5$ μm upon heat treatment. The composition the invention also comprises a fiber reinforced composite with a high degree of filling and densification of its preform resulting in a composition containing a low level of porosity and high fiber volume fraction.

7 Claims, 12 Drawing Sheets

CONTINUOUS-FIBER-REINFORCED AMORPHOUS CERAMIC COMPOSITION

CROSS-REFERENCE TO RELATED APPLICATION

I hereby claim the benefit under Title 35, U.S. Code Section 119(e) of any U.S. Provisional Application(s) listed below: Application No. 61/074,961 Filing Date Jun. 23, 2008

STATEMENT REGARDING FEDERALLY SPONSORED RESEARCH AND DEVELOPMENT

Not applicable

THE NAMES OF THE PARTIES TO A JOINT RESEARCH AGREEMENT

Not applicable

INCORPORATION-BY-REFERENCE OF MATERIAL SUBMITTED ON A COMPACT DISC

Not applicable

BACKGROUND OF THE INVENTION

1. Field of the Invention

The present invention relates generally to ceramic compositions and, more particularly, to reinforced ceramic compositions, and still more particularly to a novel, erosion-resistant, amorphous or nanocrystalline, ceramic-matrix composition, primarily for fabrication of continuous-fiber-reinforced ceramic composition, distinguishable from sintered powder compositions.

2. Description of the Related Art Including Information Disclosed Under 37 CFR 1.97 and 37 CFR 1.98

The following description of the art related to the present invention refers to a number of publications and references. Discussion of such publications herein is given to provide r more complete background of the scientific principles related to the present invention and is not to be construed as an admission that such publications are necessarily prior art for patentability determination purposes.

The efficient production of continuous-fiber-reinforced ceramics (CFRCs) is desirable for high-temperature aerospace and gas turbine applications. Those materials present an optimal combination of low density (~30-50% of a metal density) and the strength and toughness imparted by incorporation and embedding of long fibers of carbon or silicon carbide into a ceramic matrix. The ceramic matrices may comprise, for example, without limitation, SiC, SiNC, $Si_3N_4$, SiAlON, or the borides, nitrides, or carbides of refractory metals (e.g., Zr, Hf, Ta, W, etc). The CFRCs are a subset of a group of materials known as ceramic matrix composites (CMCs), which comprise a well inter-dispersed, intimate mixture of ceramic and reinforcement filler phases. The filler can be particles, spheroids, whiskers, needles, chards, turnings, filaments, fibers, chopped fibers, fiber thread, fiber cloth, or fabric of metals, polymers, glasses, or ceramics.

Ceramic phases are very strong, monolithic ceramic bodies, which may be single or multiphase compositions. They are, however, prone to catastrophic failure by cracking due to their brittle nature. Long continuous fibers are preferred as the reinforcement vehicle because they provide high ultimate tensile strength as shown by J. A. DiCarlo, H. M. Yun, G. N. Morscher, R. T. Bhalt, in SiC/SiC Composites for 1200° C. and Above; Handbook of Ceramic Composites, N. P. Bansal, ed. Springer Publishing, 2005, Chapter 4. Including long continuous fibers also more effectively mitigates the brittle fracturing of ceramics, a dominant mechanism of the failure of monolithic ceramics, where mechanical failure is governed by the growth of cracks. On a simplistic level, long fibers embedded in ceramics mitigate brittleness in somewhat the same way embedded rebar mitigates the cracking and disintegration of reinforced concrete.

Regardless of the type of reinforcement, all work best when they are fine in size or diameter, closely spaced (i.e., a high numerical density), and preferably geometrically ordered in the body being reinforced. In addition to strength and toughening, long fibers have the advantage that they may be assembled, such as by weaving, braiding, or the lay-up of fabric, into a preform of nearly any shape prior to formation or addition of the ceramic matrix. That process is known as densification or processing of the preform.

Ceramic matrix composites containing 2-D weave fiber reinforcement are known to undergo damage under high tensile load. Such damage can occur first by formation of cracks (transverse to loading direction) in the intertow matrix, between the plies or at yarn intersections within plies. Damage has also been detected in transverse tows (Type 1 and II cracking) typically for strain up to 0.2%, which results in a major decrease in elastic modulus (70%) (J. Lamon "Chemical Vapor Infiltrated SiC/SiC Composite" *Handbook of Ceramic Composites*, N. P. Bansal, ed. Springer Publishing, 2005, Chapter 3). These cracks initiate at macropores located between plies or next to tow intersections. The big loss of modulus means the load is now carried essentially by the matrix infiltrated longitudinal tows. For deformations >0.2%, transverse microcracks occur within longitudinal tows (stage III), which are arrested by fibers coated with a thin interfacial layer (e.g., $\leq 1$ µm of CVI PyC, BN, or in situ BN+CVI BN) that provides debonding of matrix from fibers and deflection of the cracks. During this stage, the modulus drops by only another 10% as strain approaches 0.6% and matrix damage and debonding from fibers becomes complete (i.e., saturation). The model of strain-induced damage clearly suggests that the elimination of macropores and voids would reduce localization of stresses and initiation of cracking, thereby leading to better toughness.

Several attempts have been made to produce CFRCs with a matrix comprised of a refractory metal ceramic (RMC)—i.e., borides, nitrides, or carbides of a refractory metal—or a mixed phase matrix composed of RMC and SiC. Those attempts include: (1) filament winding and deposition of a slurry containing RMC and SiC powders followed by hot pressing; (2) mixing RMC powder into a polymeric precursor to SiC, which forms SiC during pyrolysis, prior to impregnating fiber or fiber fabric with the powder-precursor mixture during lay-up into a preform followed by pyrolysis and polymer infiltration-pyrolysis cycles; and (3) mixing fiber with a slurry of RMC powder prior to or during fiber lay-up and molding into a preform followed by densification of the preform with SiC. For example, Tang et al. attempted fabrication of a carbon-fiber reinforced $ZrB_2$—SiC matrix composite by chemical-vapor-infiltration (CVI) deposition of the SiC matrix into a carbon fiber-$ZrB_2$ powder preform (see Tang, S., et al, *J. Am. Cer. Soc., May* 7, 2007). The Tang et al. composite was reported to have a flexural strength of 148 Mpa and a fracture toughness of 5.6 Mpa-$m^{1/2}$, which compares poorly to the flexural strength of monolithic SiC (205-381 MPa) prepared by chemical vapor deposition. Tang et al. mixed the $ZrB_2$ powder with carbon fibers using a fiber-powder molding technique and then the resulting preform was densified by CVI of SiC matrix. Tang et al.'s materials should not be considered high performance CFRCs, because the $ZrB_2$ phase, which was derived from preformed crystalline powder (average particle size 1.5 µm), contained large grains and was not distributed evenly throughout the fiber perform. Further, the $ZrB_2$ phase was probably not present to any significant amount inside the fiber yarn, (i.e., fiber tow), due to the difficulty of pushing powder into the small (i.e., few micrometers and submicrometer) spaces between the fibrils or filaments of the yarn. Incorporated powder evidently agglomerated and resulted in large ($\geq$10 µm) domains of the $ZrB_2$ phase, and the material had quite low $ZrB_2$ content and low fiber content: $ZrB_2$ content was only 3.9% by weight and fiber volume fraction was only 24.9%. Fiber volume fraction near 40% is desired for high-strength.

A low quality CFRC comprised of SiC fiber reinforced $ZrB_2$ plus 20 vol % SiC has been prepared by a filament winding and slurry deposition technique followed by hot pressing. In that instance, the panel density was much lower than the theoretical density for 35 vol % fiber loading (3.47 vs. 4.60 g/cm$^3$). Fiber volume within the plies was 30%, but thick matrix layers between the plies reduced the overall fiber volume fraction to 20-25% and significant amounts of porosity were seen in the matrix. Based on the apparent density and a rule-of-mixtures calculation, the matrix was about 70% dense, i.e., 30% pores; see S. R. Levine et al. (J. European Ceram. Soc., 22, 2757-2767 (2002)).

Thorough mixing of small RMC and SiC domains (i.e., grains) on a microscopic level (the finer the better) is typically required to obtain optimum mechanical, thermo-structural, and thermo-chemical properties of the composite. R. A. Cutler, "Engineering Properties of Borides;" pp. 787-803 in Ceramics and Glasses, Engineered Materials Handbook, Vol. 4. Edited by S. J. Schneider Jr., ASM International, Materials Park, Ohio, 1991. P. T. B. Shaffer, "Engineering Properties of Carbides;" ibid. pp. 804-11. For example, as reported by A. L. Chamberlain et al. (J. Am. Ceram. Soc., 87(6), 1170-1172 (2004)), the increases in strength and toughness of hot-pressed, monolithic $ZrB_2$ ceramic upon addition of 20 or 30 vol % SiC (from 565 to >1000 MPa strength and 3.5 to 5.3 Mpa-m$^{1/2}$ fracture toughness) were attributed to a decrease in average grain size. Analysis showed that the grain size decreased from ~6 µm for $ZrB_2$ alone to ~3 µm for $ZrB_2$ containing 20 or 30 vol % SiC. The billets contained about 2 vol % WC contaminant for all of the above compositions, as a result of attrition milling the commercial $ZrB_2$ and SiC powders (2 and 0.7 µm particle size, respectively) using cobalt-bonded WC media and a cobalt-bonded WC spindle, so the measured strength for $ZrB_2$ of 565 MPa was significantly higher than strengths reported for phase-pure $ZrB_2$. S. R. Levine et al. (J. European Ceram. Soc., 22, 2757-2767 (2002)) illustrates another example of the importance of thorough intermixing of RMC and SiC domains. The work of the Levine group used fractographic analysis of hot-press sintered $ZrB_2$ containing 20 vol % SiC by, which was composed of equiaxed grains of $ZrB_2$ (6 to 12 µm wide) and elongated grains of SiC (1.5-3 µm thick by 3-11 µm long) to show that fracture during flexural strength testing was often attributed to a number of features. Those features included "large clusters of relatively coarse $ZrB_2$ grains surrounding groups or clusters of large SiC grains." The Levine, et. al material was virtually pore-free and individual large SiC or $ZrB_2$ particles of width $\geq$20 µm were not observed. The features often took on a more or less spherical shape indicating the possibility of spherical agglomerates that had not separated from the surrounding matrix during sintering.

Other investigations have reported on the action of SiC as a grain-growth inhibitor in the sintering of $TiB_2$ and $ZrB_2$. See, e.g., R. Telle, L. S. Sigl, and K. Takagi, "Boride-Based Hard Materials;" pp. 803-945 in Handbook of Ceramic Hard Materials. Edited by R. Riedel, wiley-VCH, Weinheim, Germany, 2000. Furthermore, F. Monteverde has reported that addition of 10 vol % ultra-fine SiC particulate was the key factor that enabled both control of the diboride grain growth (average size=3 µm) and the achievement of full density, as well as the enhancement of the strength and oxidation resistance of $ZrB_2$; see, Appl. Phys. A 82, 329-337 (2006), Beneficial effects of an ultra-fine SiC incorporation on the sinterability and mechanical properties of $ZrB_2$".

All the examples pinpointing the importance of thoroughly mixed small grains pertain to sintered powder compacts. Those examples: (1) illustrate the significance of using a fine-grained microstructure with well dispersed $ZrB_2$ and SiC phases to obtain a matrix with superior mechanical properties and high oxidation resistance; (2) suggest an upper limit of about 3 µm for the size of $ZrB_2$ grains to achieve high-performance structural materials; and (3) show that very high temperatures are required to sinter $ZrB_2$+SiC composites (900° C. hot-pressing was used in the previous examples).

Similar results have been reported for pressureless sintering of $ZrB_2$ using <4-wt % boron carbide ($B_4C$) and carbon as sintering aids. W. G. Fahrenholtz et al. showed that pressureless sintering of 2-µm $ZrB_2$ particles could be achieved at 1900° C., only if $B_4C$ and/or C were added to react with and remove the surface oxide on the particles. The oxygen-based impurities on the $ZrB_2$ particles poisoned sintering, but the sintering temperature was reduced from 1900 to 1850° C. by reduction of the particle size to 0.5 µm and removal of oxygen content by chemical reaction; see W. G. Fahrenholtz et al., J. Am. Ceram. Soc., 91[5], 1398-1404 (2008).

A lower limit for grain size to achieve high strength has not been established. Amorphous character has been shown to be important for wear resistance of high-strength, high-fracture-toughness, and unidirectionally aligned silicon nitride (UA-SN). Studies by N. Nakamura et al. (J. Am. Ceram. Soc., 87(6), 1167-1169 (2004)) showed that ion implantation of the UA-SN surface with $B^+$, $N^+$, $Si^+$ and $Ti^+$ ions lowered the wear rate by 20 fold in the direction parallel to the grain alignment. Their transmission electron microscopy analysis of cross-sections "indicates the high wear resistance was attributed to the amouphous surface caused by the ion implantation."*****

CFRCs obtained from infiltration of the preform with a suspension of RMC particles in a preceramic polymer typically are not high quality, because the fiber preform acts like a filter which separates the powder from the preceramic polymer. That separation leads to build up of the powder on the outside of the yarns of the preform, which in turn results in little penetration of the powder into the preform and the yarns. Regardless of the extent of penetration, the finess of the domain size is limited by the size of the particles and their agglomerates in suspension. Even when nano-sized powder is used, agglomeration of the nano particles can prevent their diffusion into the preform and the fiber threads. Only one prior effort has come close to synthesis of refractory metal-boride-SiC or refractory metal-boride+carbideSiC ceramic phases by means without addition of at least one ceramic powder. M. M. Guron et al. reported attempts to form $ZrB_2$/ZrC/SiC and $HfB_2$/HfC/SiC ceramic composites by pyrolysis of mixtures of Zr or Hf metal powder dispersed into blends of preceramic polymer precursors to SiC and $B_4C$ (polymethylcarbosilane and poly(norbornenyldecaborane), respectively). Although the pyrolysis of the blends of preceramic polymers without metal added gave carbon-containing SiC and $B_4C$ ceramic phases apparent by XRD of 1300 and 1600° C. chars, respectively (i.e, $SiC/B_4C/C$ composite phase after treatment at 1600° C.), pyrolysis at 1600° C. of blends containing Hf or Zr powder gave only diffraction evidence for $HfB_2$ or $ZrB_2$ and initial crystallization of HfC or ZrC. No SiC diffraction peaks were observed for chars derived from metals dispersed in the polymer blends. They reported that the char material was "composed of metal-boride and metal-carbide crystallites imbedded in an amorphous silicon carbon framework," and "that ZrC and HfC crystallization was incomplete at these temperatures;" see M M. Guron, M. J. Kim, L. G. Sneddon, "A Simple Polymeric Precursor Strategy for the Synthesis of Complex Zirconium and Hafnium-Based Ultra High-temperature Silicon-Carbide Composite Ceramics," *J. Am. Ceram. Soc.*, 91(5), 2008, 1412-1415). In fact CFRC composites have not been formed using that precursor system, presumably due to the challenge of incorporating the Zr or Hf metal powder/preceramic polymer mixture, which is a solid, into a fiber preform.

Traditionally, ceramic bodies have been formed by sintering of powder compacts, known as the green state, which are produced by compaction of crystalline ceramic powders under high pressures. High-quality, high-performance CFRCs cannot be formed by traditional powder pressing methods and their variations, because the high pressures used damage and fracture the reinforcement fibers. The problem can be side-stepped by incorporation of very short fibers, whiskers, or chopped fibers into powder compacts. However, the short fibers do not impart the level of ultimate strength, toughness and resistance to fracturing that is desired for many commercial and industrial applications.

CFRCs comprising a nominal SiC matrix have been developed using pyrolysis of liquid or polymer based precursors for formation of the ceramic matrix within, and densification of, a fiber preform. That approach allows build-up of matrix and densification of the preform by the polymer-infiltration-pyrolysis (PIP) process without applying unwanted force on the fibers. The process relies on infiltration or flooding of the fiber preform with a solution or polymer of sufficiently low viscosity to allow penetration not only into the space between the threads of fiber but also into the microscopic spaces inside the threads of the fiber (i.e. the space between the fibrils that comprise the fiber). Polymer precursors are available for formation of SiC and SiNC matrices by the PIP process. Commercial polymers for manufacturing CFRCs using that process include Kion's Ceraset Polysilazane 20 and HTT1800 products, and Starfire's SMP 10 (allyl-hydropolycarbosilane). The CFRC composites formed by this method are often referred to as C/SiC or SiC/SiC depending on whether the reinforcement is carbon fiber or SiC fiber, respectively.

CFRC composites containing a mixed ceramic phase, such as $ZrB_2$ intimately mixed with SiC ($\leq 1$ μm domains), are desired for applications where the composite must survive in extreme environments like hypersonic flight. That is because research has shown that the mixed ceramic phase forms a durable protective scale under those conditions, which provides more oxidation resistance than the scale of SiC alone. Those characteristics were demonstrated using monolithic pieces of the $ZrB_2$—SiC matrix formed by hot pressing of a mixture of the powders; see M. M. Opeka, I. G. Talmy, and J. A. Zaykoski, J. of Mat. Sci., 39, 5887-5904 (2004). Furthermore, silicon carbide composite composed mainly of SiC containing $ZrB_2$ in an amount up to 50 volume % by sintering of powders resist penetration of, and erosion by, molten metals, such as molten steel, in a superior fashion. (J. Sugawara and S. Hosokawa, U.S. Pat. No. 4,735,923) The performance of the mixed phase ceramic is superior to that of either ceramic component alone, as SiC tends to react with molten ferrous metals and oxides thereof.

BRIEF SUMMARY OF THE INVENTION

Objects, advantages and novel features, and further scope of applicability of the present invention will be set forth in part in the detailed description to follow, taken in conjunction with the accompanying drawings. the objects, advantages and novel features, and further scope of applicability of the present invention will become apparent to those skilled in the art upon examination of the following, or may be learned by practice of the invention. The objects and advantages of the invention may be realized and attained by means of the instrumentalities and combinations particularly pointed out in the appended claims.

The present application discloses and claims a unique CFRC ceramic material composition comprising a fine grained $ZrB_2$—SiC matrix reinforced with SiC, C, or an oxide fiber.

A primary object of the present invention is to provide a unique material composition principally due to: (1) the small domain sizes ($\leq 0.5$ μm) of the matrix components; and (2) the high degree of filling and densification of the fiber preform. In other words, the composite of the present invention contains a low level of porosity and high fiber volume fraction.

Another object of the present invention is to provide a material composition which is formed by efficient intermixing of the ceramic phases of the matrix and comprises small domain size for each phase. Those properties are important for: (1) good mechanical properties; (2) inhibiting grain size growth at high temperatures; and (3) formation of protective oxide scale that resists ablation under, for example, hypersonic conditions or the environment of a gas-turbine hot section.

A further object of the present invention is to provide a unique material composition which is not derived from a powder slurry or preformed ceramic powder which results in unique microstructure and mechanical and thermo-physical properties at high temperatures, e.g. temperatures above 1000° C., where CFRCs derived from powder compacts or sintered powder compacts, are less durable.

Still another object of the present invention is to provide a composition wherein the ratio of B to Zr can vary and in particular can be much lower than that of stoichiometric $ZrB_2$, which is not obtainable when using $ZrB_2$ powder. For the CFRC with $ZrB_2$—SiC matrix used in the present application, the ratio was about 1.4, a composition which has been shown to exhibit superior oxidation resistance. The ratio can range from about 1 to 4. The weight ratio of SiC phase to $ZrB_2$ phase can be varied as well, from about 100 to about 0.1.

Still another object of the present invention is to provide a composition which can take on any arbitrary near net shape as formed without machining and tooling, and is not limited by the geometries available from high pressure dies. The fiber architecture can be varied at will from simple 2-dimensional lay-ups to complex 3-dimensional woven preforms.

Finally, another object of the present invention is to provide a composition in which the domain size of the ceramic phases is small compared to the fiber diameter. As shown by X-ray diffraction (XRD) and scanning electron microscopy (SEM) analysis, there are amorphous or nanocrystalline $ZrB_x$ phases which possibly cannot be obtained by other means, such as from incorporation of $ZrB_2$ powder. These phases and their intimacy may greatly enhance the tensile, interlaminar, and flexural strength and fracture toughness of the composite.

BRIEF DESCRIPTION OF THE SEVERAL VIEWS OF THE DRAWINGS

The accompanying drawings, which are incorporated into and form a part of the specification, illustrate an embodiment of the present invention and, together with the description, serve to explain the principles of the invention. The drawings are only for the purpose of illustrating a preferred embodiment of the invention and are not to be construed as limiting the invention.

DETAILED DESCRIPTION OF THE INVENTION

Figure 1:
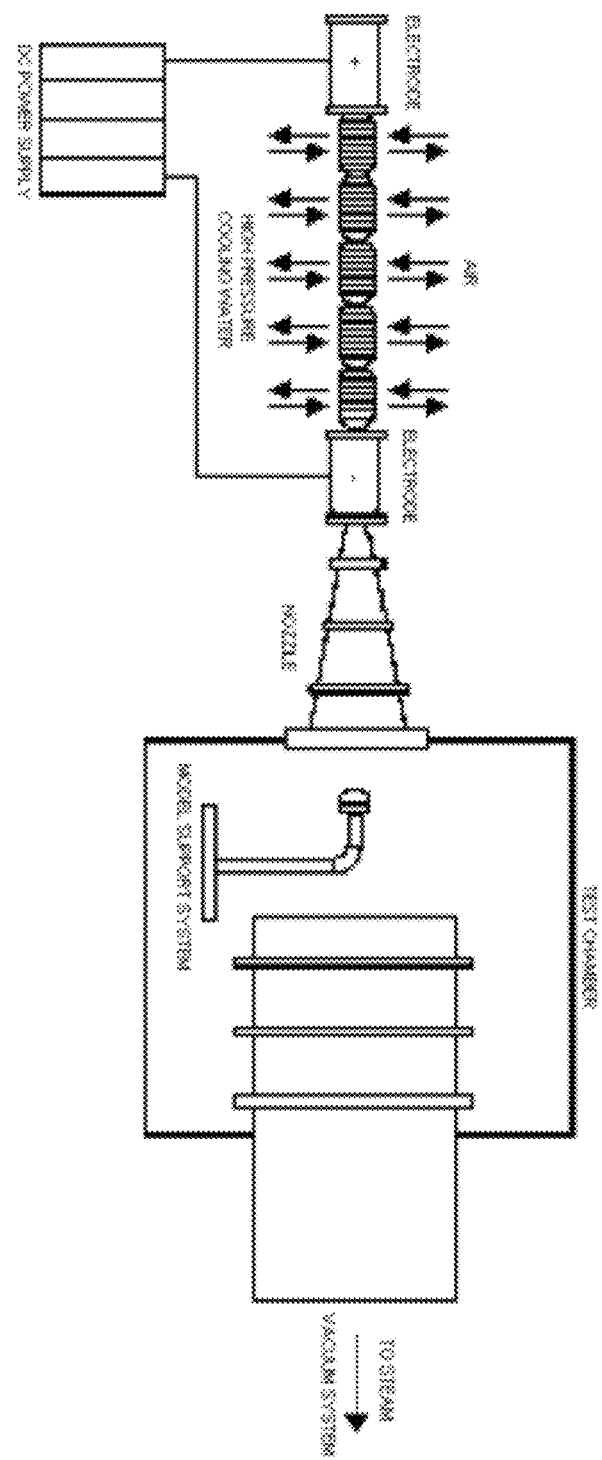
FIG. 1: An arc-jet testing rig schematic

U.S. Pat. No. 5,364,607 to Tebbe teaches a method to produce insoluble zirconium- and hafnium-boride precursor complexes as a solid precipitate or film, by deposition from solution, comprising contacting a solution of M(BH$_4$)$_4$ wherein M is Zr or Hf with a Lewis base (LB) to yield metal boride MB$_x$, wherein x is about 2, upon heating of the solid complex above about 200° C. The precursor complex comprises a mixture of oligomers of formula (II), [MB$_2$H$_x$]$_n$ wherein M is Zr or Hf, x is from 0 to 9, and n is a least 4. That complex has a boron to metal ratio of about 2. The Tebbe patent lists suitable Lewis bases for use in the reaction sequence to form the precursor complex to include: phosphines, arsines, amines, and ethers. Tebbe discloses that the phosphines are preferred, especially aryl- or alkylphosphines having a cone angle greater than 135°. Use of a bulky tertiary phosphine leads to hydrogen evolution, formation of (B$_2$H$_6$)$^{2-}$ bridges, and precipitation of a base free solid of formula (II)." The art states that the concentration of the Lewis base must be determined (i.e., low), so as to prevent precipitation of colorless H$_3$B-LB. "The product of formula (II) precipitates as a black film or solid and is washed extensively with fresh solvent to ensure removal of any H$_3$B-LB."

Applicants tested the Tebbe process to produce ZrB$_2$ precursor and fabricate ZrB$_2$ matrix composites, using the most preferred LB, an arylphosphine, specifically triphenylphosphine. Although formation of the complex appeared to occur, it proved difficult to remove the H$_3$B-Lb from the precursor, particularly when bulk quantities of precursor were generated instead of thin films. It was not practical to wash the product with sufficient fresh solvent to ensure removal of the by-product H$_3$B-LB. A space filling, high purity precursor with high-volume yield was desired for the formation of the ceramic matrix of ceramic composites. Furthermore, a soluble or stable suspension formulation was desired for efficient and complete infiltration of fiber preforms or the coating of fibers with a thin (about 1 µm thick) layer of ZrB$_2$ precursor to enable formation the fiber-matrix interfacial layer prior to assembling the fibers into a preform.

We discovered that the lighter, liquid LB, triethylamine, which is a member of the amine family of Lewis bases, worked much better for reaction with M(BH$_4$)$_4$, because the reaction gave a stable liquid form of MB$_x$ precursor, where x is about 1.4, combined with a liquid H$_3$B-LB (i.e., borane triethylamine complex with m.p.=-4° C. and b.p.=97° C./12 mm Hg). The liquid H$_3$B-LB was easily distilled away from the precursor complex to produce a thick oil or paste that was an ideal precursor formulation for fabrication of CFRCs or SiC-powder reinforced composite, whose ceramic matrix was an amorphous or nanocrystalline substoichiometric zirconium boride (ZrB$_x$) upon pyrolysis. Some of the liquid H$_3$B-LB could be left mixed with the precursor complex, acting as a solvent, to produce a stable dilute solution form of the precursor. It was ideal for infiltration of the preform and converted into an amorphous ZrB$_2$ ceramic phase upon pyrolysis. The stable solution form obtained from the reaction mixture without further purification other than removal of some of the borane triethylamine complex was dissolved into a polycarbosilane precursor to SiC or polysilazane precursor to SiCN to prepare liquid mixed precursor formulations that yielded a fine grained composite matrix of ZrB$_x$—SiC. The mixed precursor formulation was used to prepare SiC fiber reinforced, SiC+ZrB$_x$ matrix composite panels by the PIP process using stacked SiC fabric plies as the preform via a standard autoclaving step. Lastly, the concentrated precursor solution was useful when mixed with SiC powder to form a high viscosity paste. The paste had sufficiently high ceramic volume yield upon pyrolysis to form a ceramic joint between SiC-based CMCs and a SiC surface.

In contrast to the prior art, the studies supporting this application have showed that a trialkyamine is the preferred LB for the formation of MB$_2$ precursor useful for fabrication of CMCs and other ceramic matrix applications where a liquid precursor is beneficial, such as in the coating of fibers to produce the fiber-matrix interfacial layer or the infiltration of porous surfaces. The use of trialkyamine as the LB facilitated, among other accomplishments:

1. use of the LB as both reactant and solvent during and after reaction with M(BH$_4$)$_4$;
2. formation of a stable liquid precursor to ZrB$_x$, which was miscible with other polymer precursors;
3. formation of bulk quantities of high purity precursor more efficiently;
4. efficient infiltration of woven fabric of SiC and C and oxide fibers;
5. pouring and draining of the precursor in concentrated form; and
6. incorporation of an alkylamine into the precursor formulation which is known to yield BN ceramic upon pyrolysis.

Uses of the ceramic matrix of the invention include, but are not limited to:
1. Component of a paste for joining ceramic surface together;
2. Reducing agent or oxygen getter or sintering agent for densification of ceramic powder compacts;
3. Oxidation resistant bond coat for environmental barrier coatings or coatings on turbine hot section components, kilnware, furnace elements, glow plugs, polymer-matrix composites, fibers of CMCs, rocket nozzles, combustion chambers and pistons, leading edges of hypersonic vehicles;
4. Testing of the oxidation resistance of the material under simulated reentry conditions was performed by measuring the time to burn through panels using an oxy-acetylene torch and by measurement of the lifetimes and ablation rates of panels in a Mach 5 arc-jet operated at a heat flux of 252 BTU/ft$^2$-s at a stagnation pressure of 2.0 psia.

An arc-jet testing rig schematic is shown in FIG. 1. Burn-through times were compared to those for a SiC/SiC panels that did not contain $ZrB_2$.

Table 1 lists the CMC panel compositions tested. All specimens were fired at the same temperature; Specimen A was sintered after fabrication. Table 2 shows failure times (i.e. breakthrough times) and ablation rates (i.e. thickness loss/failure time) for the specimens tested with the arc-jet.

TABLE 1

CMC Panel Compositions tested in arc-jet.

| SPECIMEN | FIBER TYPE | MATRIX PRECURSOR | MATRIX |
|---|---|---|---|
| A: SiC/ZrB$_2$-SiC | Nicalon Type S | Proprietary resin | Sic/ZrB$_x$ |
| B: SiC/ZrB$_2$-SiC | Nicalon Type S | Proprietary resin | Sic/ZrB$_x$ |
| C: SiC/SiC | Nicalon Type S | Kion HTT 1800 | SiC |
| D: SiC/SiC | Tyranno SA | Kion HTT 1800 | SiC |

TABLE 2

Burn through times and ablation rates for Arc Jet testing at Mach 5, heat flux of 252 BTU/ft$^2$-s, and stagnation pressure of 2.0 psia

| SPECIMEN | FAILURE TIME (S) | ABLATION RATE (μm/min) | THICKNESS LOSS | FINAL DENSITY |
|---|---|---|---|---|
| A (scale removed) | 890 | 13 | 12% | 1.5, 70% |
| B (scale removed) | 631 | 16 | 10% | 1.6, 77% |
| B (with scale) | 631 | −12 | −8% | 1.5, 70% |
| C | 245 | 147 | 50% | 2.0, ~100% |
| D | 209 | 205 | — | — |

Figure 2:
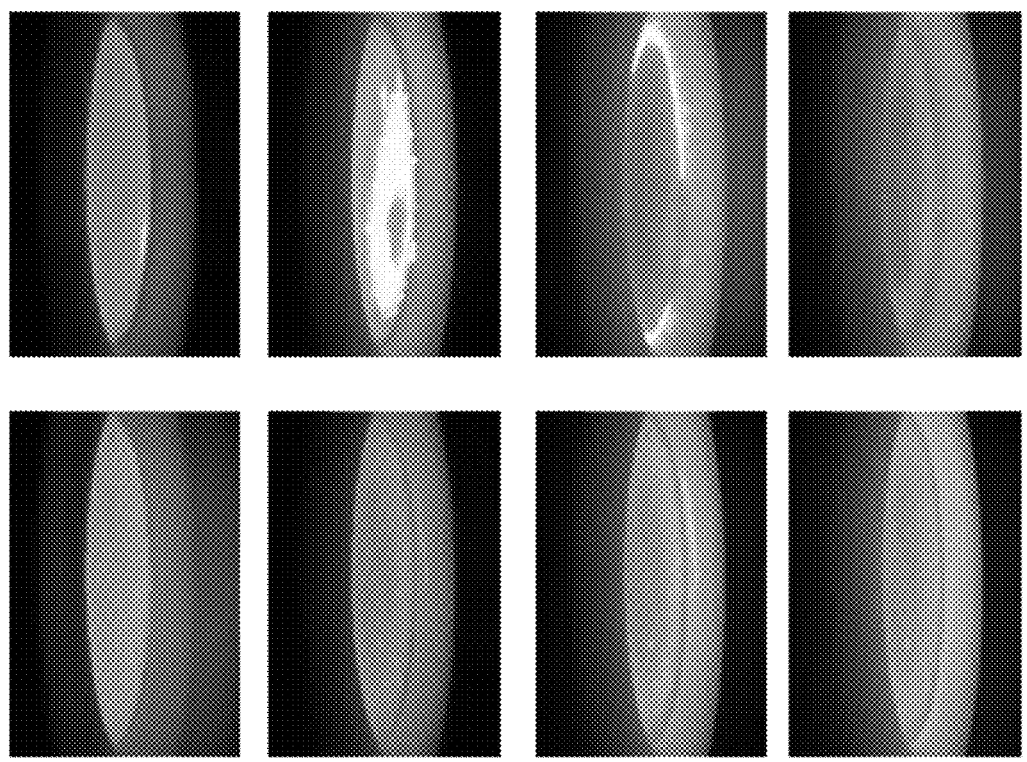
FIG. 2: Time lapse photographs of specimens A and C taken during Arcjet testing, time=0-2 minutes. Arcjet conditions were Mach 5, heat flux of 252 BTU/ft$^2$-s, and stagnation pressure of 2.0 psia.
Figure 3:
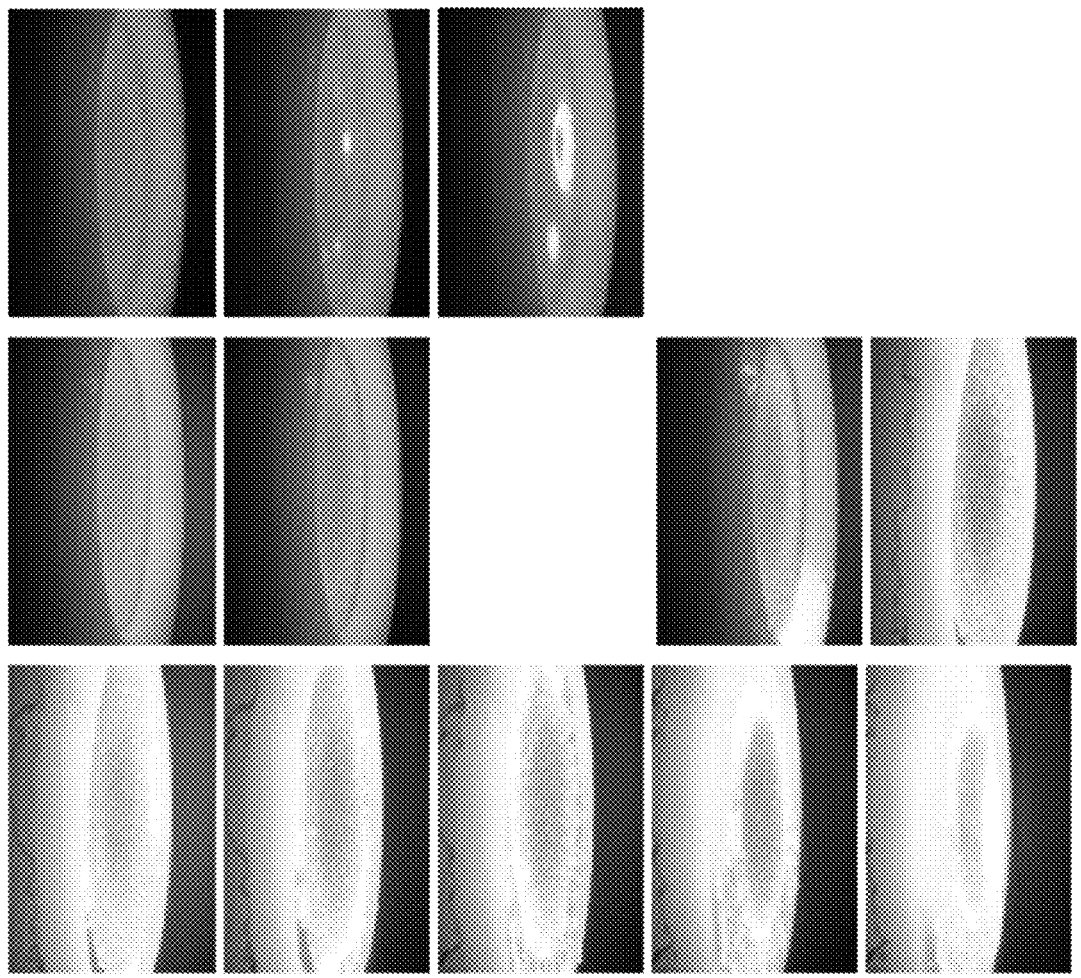
FIG. 3: Time lapse photographs of specimens A and C taken during Arcjet testing, time=3-11.5 minutes. Arcjet conditions were Mach 5, heat flux of 252 BTU/ft$^2$-s, and stagnation pressure of 2.0 psia. Specimen C (SiC/SiC) fails just after the 4 minute mark.

FIGS. 2-3 show time-lapse photographs of specimens in the arc-jet. The specimens were mounted in a SiC-coated graphite cylindrical holder and were facing toward the jet to the right without warm-up. FIG. 3 shows that Specimen C ablated quickly but Specimen A of the present invention did not.

Figure 4:
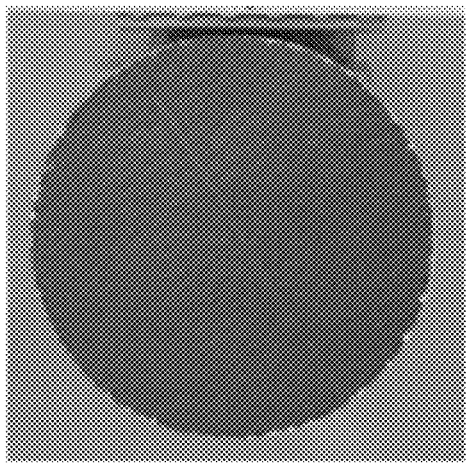
FIG. 4: Time lapse photographs of specimens A during Arcjet testing, time=12-15 min. Arcjet conditions were Mach 5, heat flux of 252 BTU/ft$^2$-s, and stagnation pressure of 2.0 psia.
Figure 4:
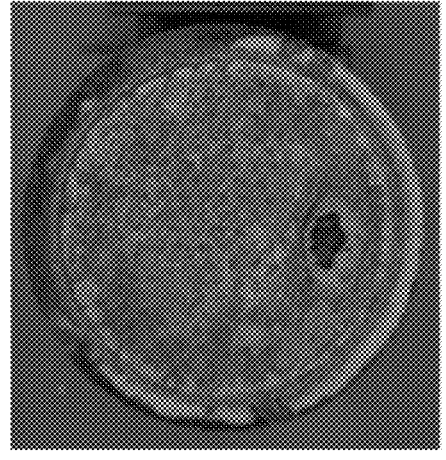
Figure 5:
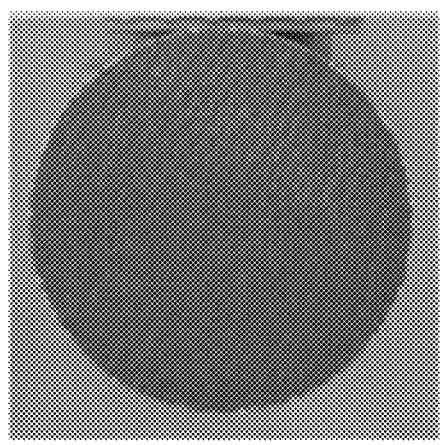
FIG. 5: Pre (top) and Post (bottom) Arcjet testing of specimen A (left) and specimen C (right). Arcjet conditions were Mach 5, heat flux of 252 BTU/ft$^2$-s, and stagnation pressure of 2.0 psia.
Figure 5:
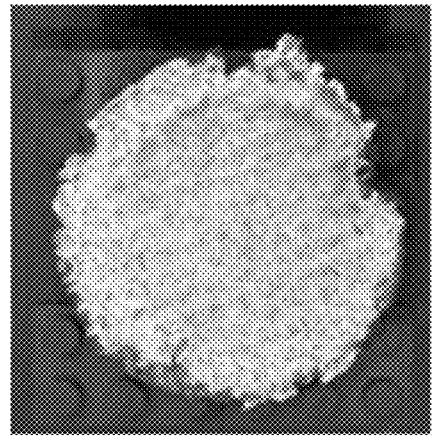

The burn-through times with an oxy-acetylene torch of panels from the mixed matrix were nine fold longer than those for the baseline panels. In arc-jet testing the SiC/ZrB$_2$—SiC CMC of the present invention out-performed the SiC/SiC baseline resulting in about 4× longer life, which was cut short due to holder failure, and 10× lower ablation rate. The present compositions developed robust zirconia-silica scale, which protected against surface ablation. As shown in FIG. 4, little or no ablation occurred in center of SiC/ZrB$_2$—SiC specimen discs; instead, mass loss occurred from within the specimens and at their edge due to loss of the holder. FIG. 5A is a pre-test photograph of Specimen A; FIG. 5B is a post-test photograph of Specimen A (actual size=1.5 in. diameter). FIG. 5C is a pre-test photograph of Specimen C; FIG. 5D is a post-test photograph of Specimen C (actual size=2.75 in. diameter).

Figure 6:
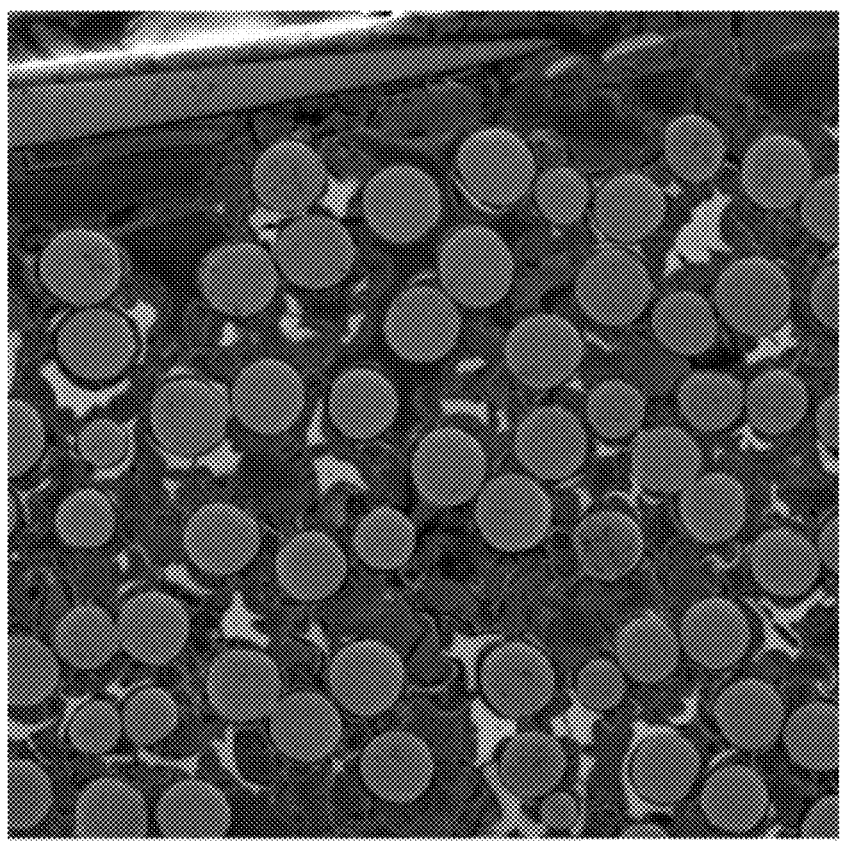
FIG. 6: SEM/EDS of cross-section of as-processed original SiC+ZrB$_2$ matrix composite.
Figure 6:
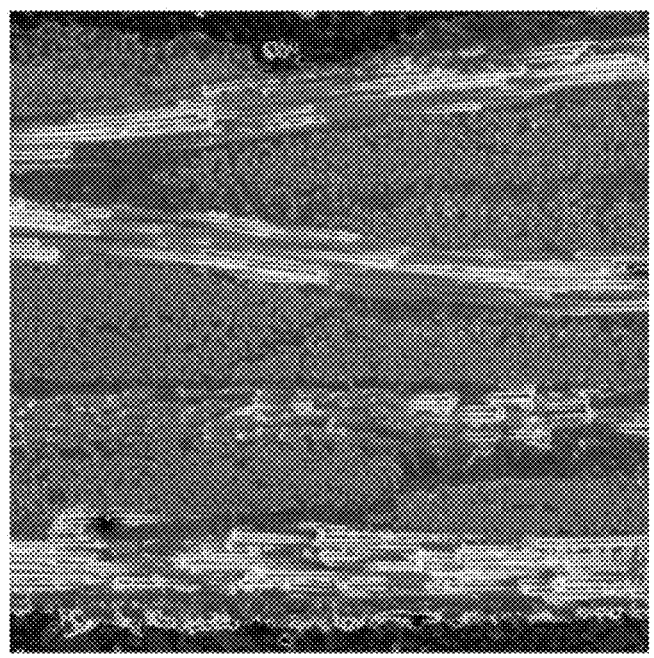
Figure 7:
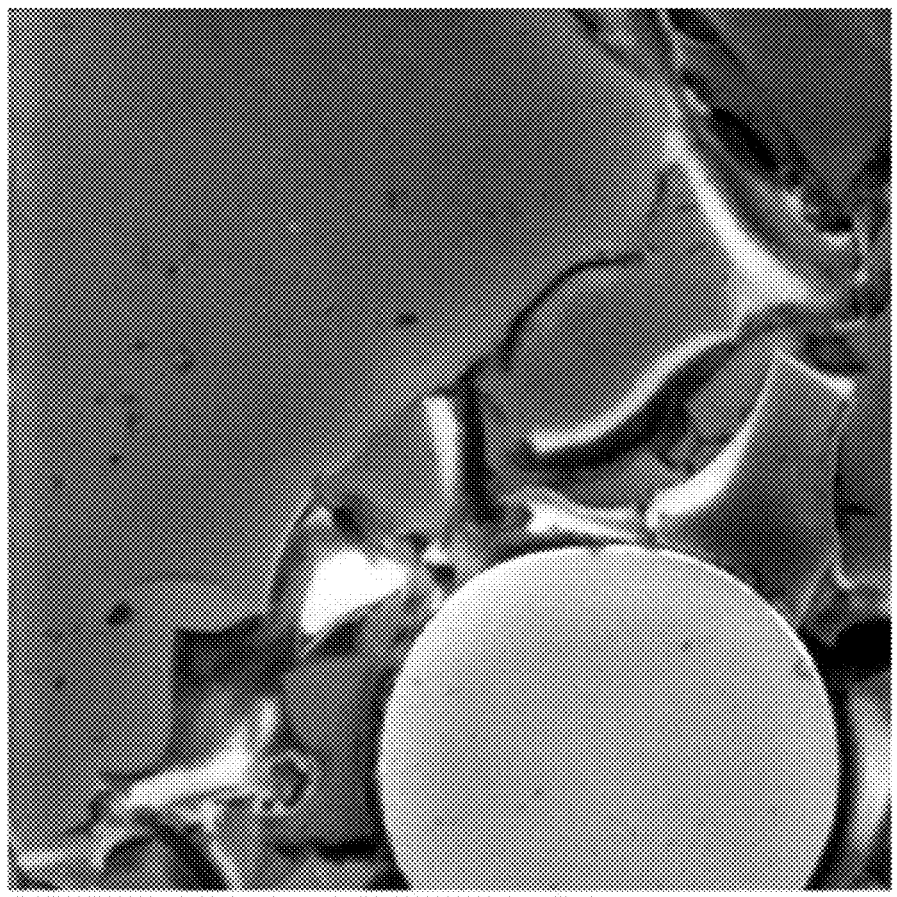
FIG. 7: SEM/EDS at higher resolution of the as-processed original SiC+ZrB$_2$ matrix composite.
Figure 8:
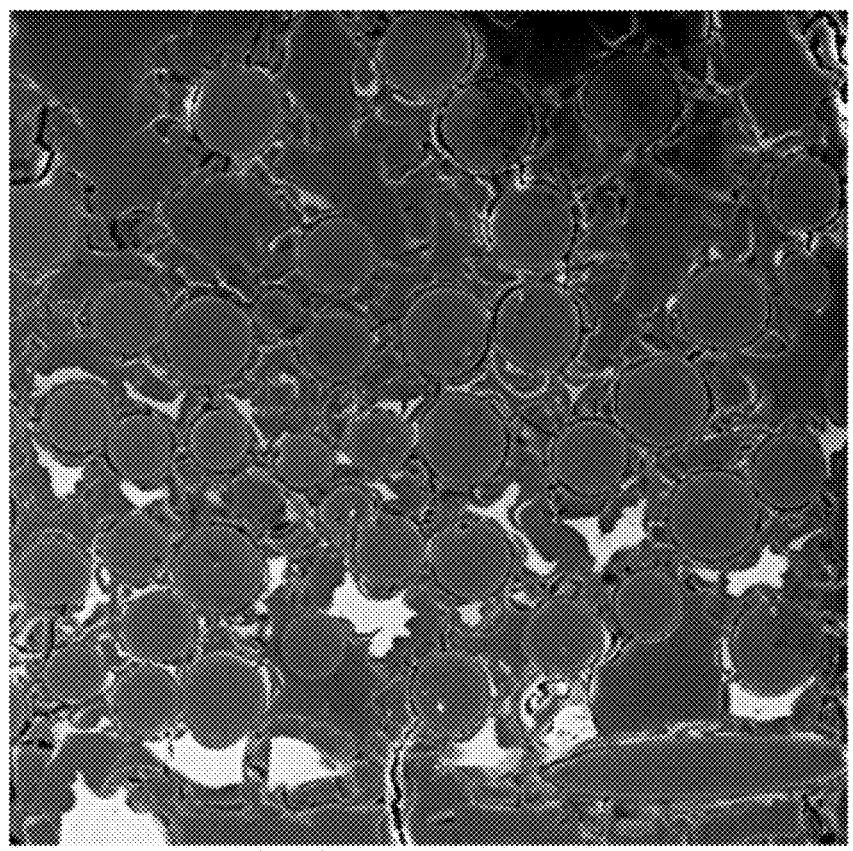
FIG. 8: SEM/EDS image of panel sintered at 1300° C., SiC+ZrB$_2$ matrix composite.
Figure 8:
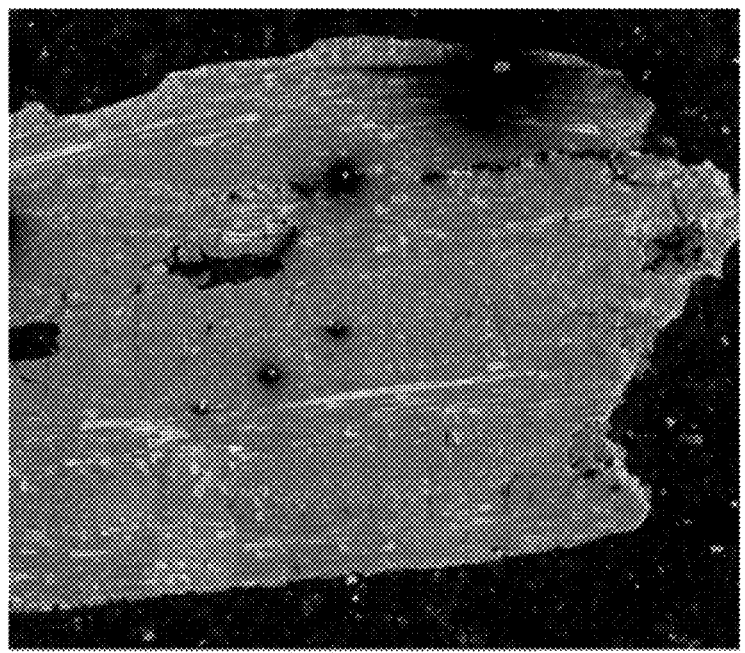
Figure 9:
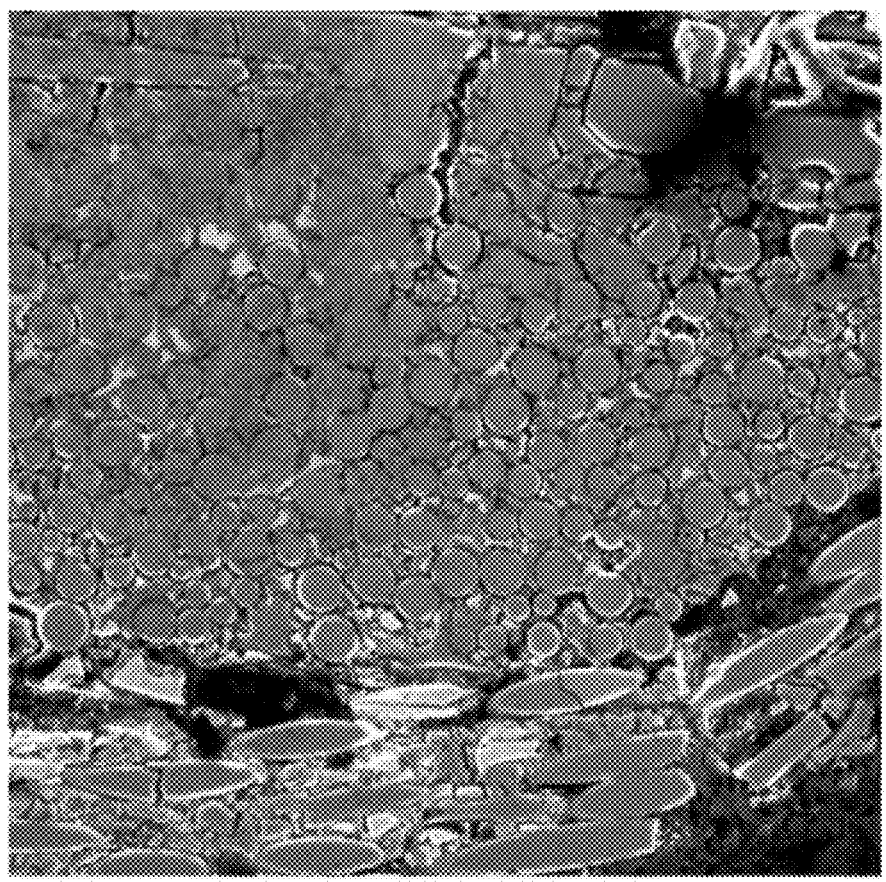
FIG. 9: SEM/EDS of panel sintered at 1500° C., SiC+ZrB$_2$ matrix composite.
Figure 9:
Figure 10:
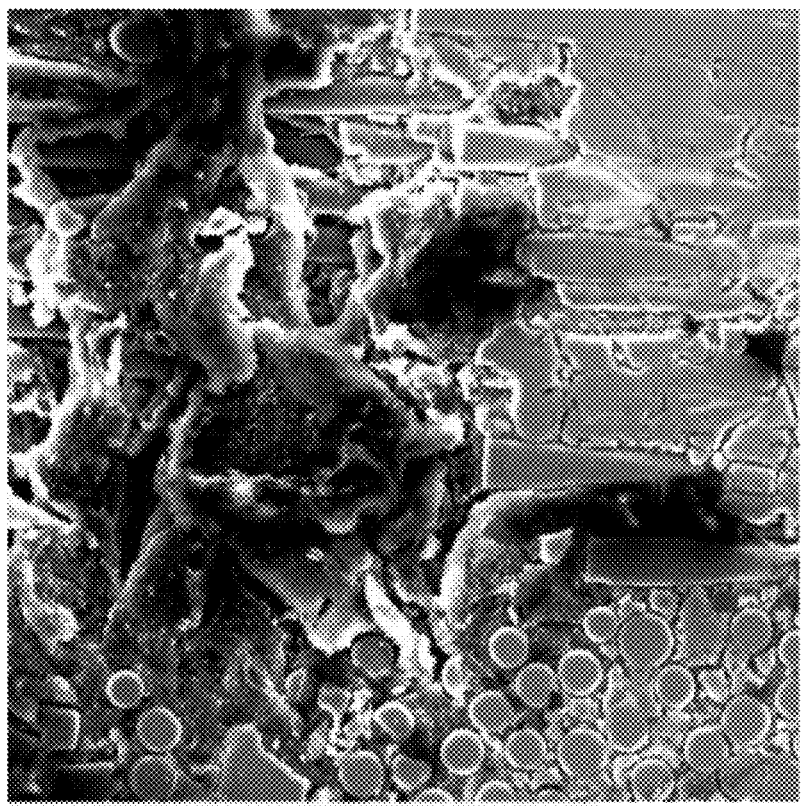
FIG. 10: A second region of the SEM/EDS of the sintered at 1500° C., SiC+ZrB$_2$ matrix composite.
Figure 10:
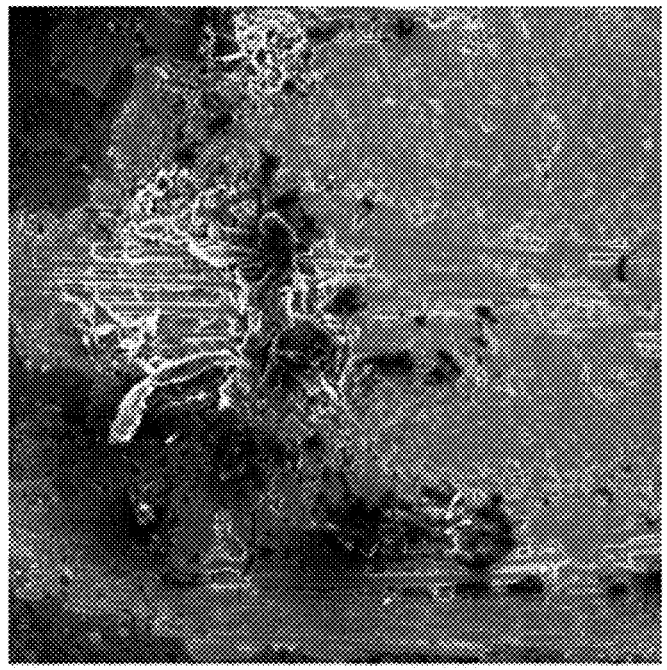
Figure 11:
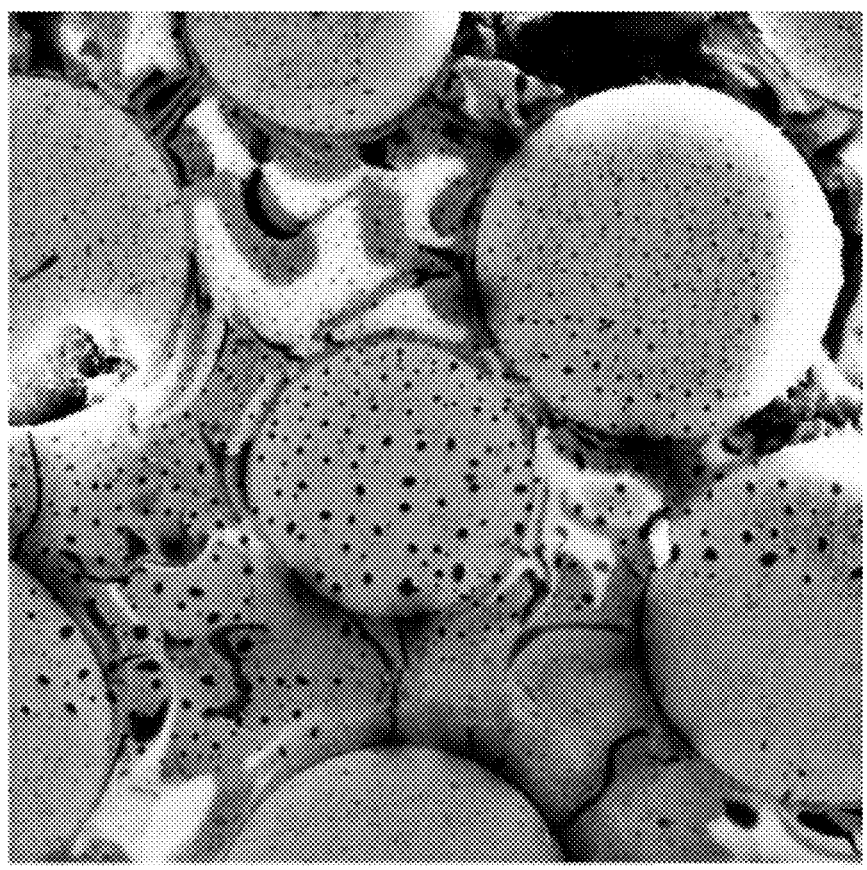
FIG. 11: SEM/EDS of panel sintered at 1700° C., SiC+ZrB$_2$ matrix composite.
Figure 11:
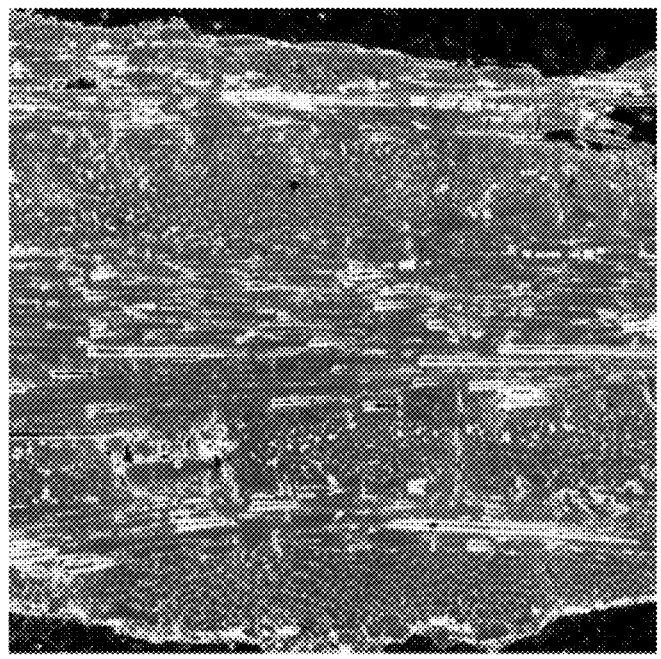
Figure 12:
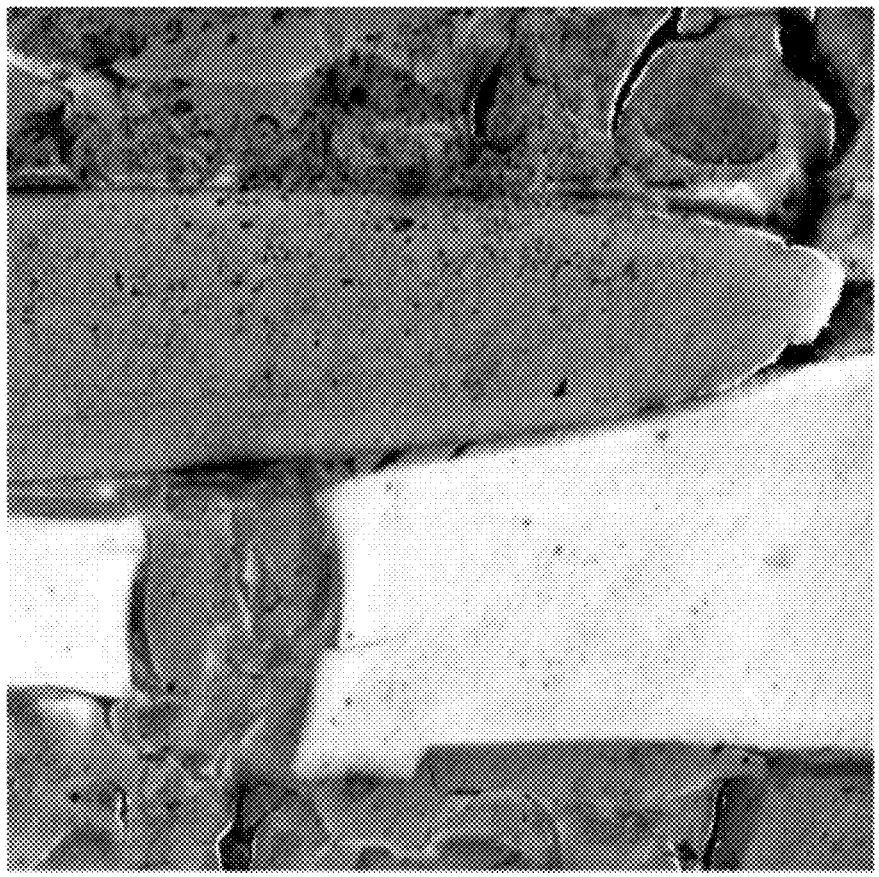
FIG. 12: SEM/EDS of second region of panel sintered at 1700° C., SiC+ZrB$_2$ matrix composite.
Figure 12:

X-ray diffraction (XRD) and scanning electron microscopy with energy dispersive spectroscopy (SEM/EDS) for analysis of elements was obtained for the SiC+ZrB$_2$ matrix composites of the as-processed original panel (OP), specimens A and B above, after sintering at 1300, 1500, and 1700° C. (—S13, —S15, and —S17), after arcjet testing and after oxy-acetylene torch testing of —OP and sintered specimens (TTOP, TTS13, TTS15, and TTS17). XRD data summarized in Table 3, which give relative peak sizes for each phase, showed that the ZrB$_2$ is amorphous after processing at 1050° C. and does not become crystalline until sintering at 1300° C. or above. XRD for the as processed panel shows ZrB$_2$ present as an amorphous phase. This result is supported by the SEM of this specimen (FIG. 6), in which no crystallinity can be observed, even for resolutions capable of distinguishing 1 um or less (FIG. 7). Once temperatures reach 1300° c. or above, a transformation to hexagonal ZrB$_2$ occurs. However SEM of these images show no discreet domains (FIGS. 8-11). Even in the best microphotograph close-ups with 6-μm scale bar (FIG. 12), no domains can be seen indicating crystallinity is quite small and can be considered nanocrystalline.

TABLE 3

Relative size of X-ray diffraction peaks for amorphous and nanocrystalline phases of SiC-fiber reinforced, SiC + ZrB$_2$ matrix composites for: as-processed original panel (OP), after sintering at 1300, 1500, and 1700 °C. (-S13, -S15, and -S17), or after oxy-acetylene torch testing of -OP and sintered specimens (TTOP, TTS13, TTS15, and TTS17).

| | Phases Present | | | | | | | |
|---|---|---|---|---|---|---|---|---|
| Sample | SiC (Cub) | SiO$_2$ (Hex) | SiO$_2$ (Tri) | SiO$_2$ (Amorph) | ZrO$_2$ (Tet) | ZrO$_2$ (Mono) | ZrB$_2$ (Hex) | ZrB$_2$ (Amorph) |
| 6-071-OP | 2 | | 3 | | 1 | | | 4 |
| 6-119-OP | 2 | | | | 1 | | 4 | 3 |
| 6-119-S13 | 2 | | | | 1 | 3 | 4 | |
| 6-119-S15 | 2 | 4 | | | 3 | | 1 | |
| 6-127-S17 | 2 | 4 | | | 1 | | 3 | |

TABLE 3-continued

Relative size of X-ray diffraction peaks for amorphous and nanocrystalline phases
of SiC-fiber reinforced, SiC + ZrB$_2$ matrix composites for: as-processed original panel (OP),
after sintering at 1300, 1500, and 1700 °C. (-S13, -S15, and -S17), or after oxy-acetylene
torch testing of -OP and sintered specimens (TTOP, TTS13, TTS15, and TTS17).

| Sample | SiC (Cub) | SiO$_2$ (Hex) | SiO$_2$ (Tri) | SiO$_2$ (Amorph) | ZrO$_2$ (Tet) | ZrO$_2$ (Mono) | ZrB$_2$ (Hex) | ZrB$_2$ (Amorph) |
|---|---|---|---|---|---|---|---|---|
| 6-127-AJ | 2 | | | | | | 1 | |
| 6-127-TTOP | 2 | | | 2 | 1 | | 4 | |
| 6-119-TTS13 | 2 | | | 5 | 1 | 4 | 3 | |
| 6-119-TTS15 | 2 | | | | 2 | 1 | 4 | |
| 6-127-TTS17 | 2 | | | 4 | 2 | 1 | 5 | |

Figure 13:
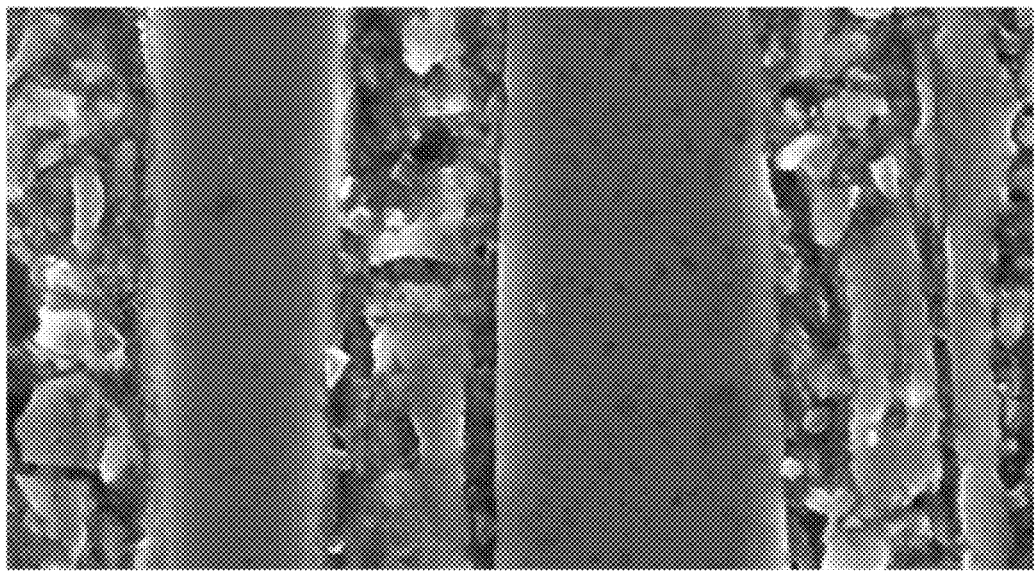
FIG. 13: SEM/EDS of the arcjet tested SiC+ZrB$_2$ matrix composite.
Figure 13:
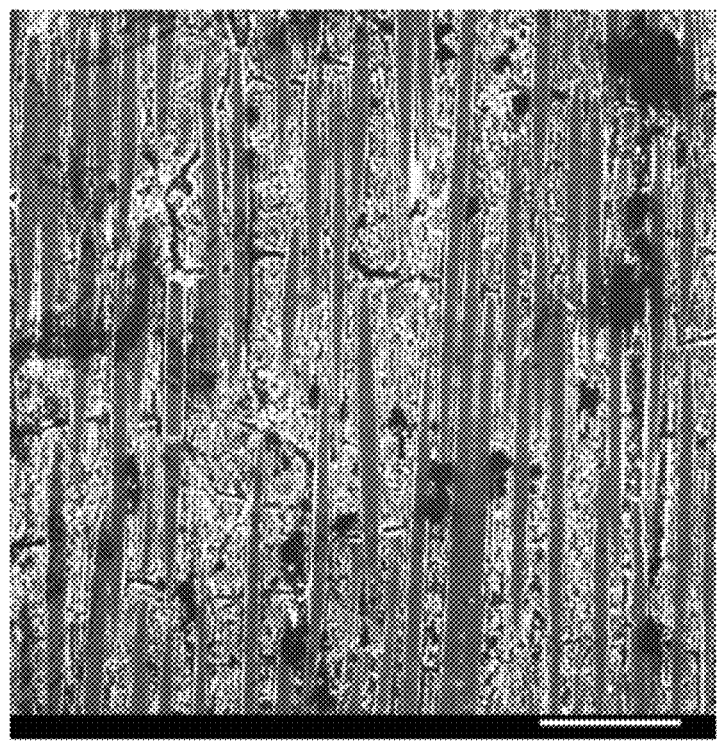

Cub = Cubic Hex = Hexagonal Tri = Triclinic Tet = Tetragonal Amorph = Amorphous 1 = Highest Peaks 5 = Lowest Peaks Due to the processing methods used, in particular poor mixing of the two precursors, there are ZrB$_2$ rich and lean regions present in these composites. Zr oxide is also incorporated due to the inadvertent inclusion of oxygen during processing. SEM analysis shows the presence of Zr, Si, B, C, O, and N in rich and lean regions. In the arcjet specimen, trace amounts of chlorine were also observed. The arcjet specimen (FIG. 13) is particularly interesting as the SiC fibers are left intact, even after the extreme conditions present during testing. More typical CMCs are prone to fiber degradation due to attack by the matrix which is not seen in this example.

Although the invention has been described in detail with particular reference to these preferred embodiments, other embodiments can achieve the same results. Variations and modifications of the present invention will be obvious to those skilled in the art and it is intended to cover all such modifications and equivalents, such as the formation of the fine grained or amorphous, well-mixed ZrB$_2$—SiC coatings on fibers or other surfaces for oxidation resistance. The entire disclosures of all patents and publications cited above are hereby incorporated by reference.

What is claimed is:

1. An oxidation resistant, continuous-fiber-reinforced ceramic composition, the composition being durable at temperatures above 1000° C., the composition being capable of taking on any arbitrary near net shape as formed without machining and tooling, the composition comprising;
   a. a fine grained ceramic matrix, the matrix comprising a mixture of a MB$_x$ phase, wherein M is selected from the group consisting of Zr and Hf, and x ranges from 1 to 4 and a SiC phase, the matrix being reinforced with a material selected from the group consisting of SiC fiber, C fiber and oxide fiber, the matrix comprising domain sizes $\leq 0.5$ μm, the matrix being formed by mixing a liquid precursor of MB$_x$ wherein M is selected from the group consisting of Zr and Hf wherein the ratio of Boron to M in the precursor capable of ranging from about 1:1 to 4:1 with polymeric precursors of SiC and pyrolyzing the resulting mixture; and
   b. a fiber-reinforced composite with a high degree of filling and densification of its preform resulting in a composition containing a low level of porosity and high fiber volume fraction.

2. The oxidation resistant, continuous fiber-reinforced ceramic composition of claim 1, wherein the weight ratio of the SiC phase to the MB$_x$ phase ranges from about 100 to about 0.1.

3. The oxidation resistant, continuous fiber-reinforced ceramic composition of claim 1 wherein the composition is not limited by geometries available from high pressure dies.

4. The oxidation resistant, continuous fiber-reinforced ceramic composition of claim 1 wherein fiber architectures can be varied at will from simple 2-dimensional lay-ups to complex 3-dimensional woven preforms.

5. The oxidation resistant, continuous fiber-reinforced ceramic composition of claim 1 wherein the domain size of the ceramic phases is small compared to the fiber diameter.

6. The oxidation resistant, continuous fiber-reinforced ceramic composition of claim 1, wherein the ratio of boron to zirconium is 1.4:1.

7. The oxidation resistant, continuous fiber-reinforced ceramic composition of claim 1, wherein the liquid precursor of MB$_x$ is derived from reaction of an amine with M(BH$_4$)$_4$.

* * * * *